United States Patent
Rheaume et al.

(10) Patent No.: US 10,967,326 B2
(45) Date of Patent: Apr. 6, 2021

(54) ELECTROCHEMICAL DRYING OF HUMID INERT GAS FOR FUEL TANK INERTING

(71) Applicant: Hamilton Sundstrand Corporation, Charlotte, NC (US)

(72) Inventors: Jonathan Rheaume, West Hartford, CT (US); Michael L. Perry, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 156 days.

(21) Appl. No.: 16/127,980

(22) Filed: Sep. 11, 2018

(65) Prior Publication Data

US 2020/0078726 A1    Mar. 12, 2020

(51) Int. Cl.
*B64D 37/32* (2006.01)
*B01D 53/32* (2006.01)
*B01D 53/26* (2006.01)
*H01M 8/1231* (2016.01)

(52) U.S. Cl.
CPC ......... *B01D 53/326* (2013.01); *B01D 53/265* (2013.01); *B01D 53/268* (2013.01); *B64D 37/32* (2013.01); *H01M 8/1231* (2016.02)

(58) Field of Classification Search
CPC .............................. B01D 53/26; B01D 53/326
See application file for complete search history.

(56) References Cited

U.S. PATENT DOCUMENTS

| | | | |
|---|---|---|---|
| 5,169,415 A * | 12/1992 | Roettger | A62B 7/14 128/204.29 |
| 9,623,981 B2 | 4/2017 | Darling et al. | |
| 9,882,227 B2 | 1/2018 | Hoffjann et al. | |
| 9,963,792 B2 | 5/2018 | Rheaume | |
| 2015/0040986 A1 | 2/2015 | Tichborne et al. | |
| 2015/0333347 A1 | 11/2015 | Brunaux et al. | |
| 2016/0144973 A1* | 5/2016 | Darling | C25B 9/10 204/265 |
| 2017/0167037 A1 | 6/2017 | Rheaume | |
| 2017/0331131 A1 | 11/2017 | Rheaume | |
| 2017/0341019 A1 | 11/2017 | Rheaume et al. | |
| 2018/0001124 A1 | 1/2018 | Klassen et al. | |
| 2018/0087794 A1 | 3/2018 | Bahar et al. | |
| 2018/0127110 A1 | 5/2018 | Caradatos et al. | |
| 2018/0140996 A1 | 5/2018 | Rheaume | |

OTHER PUBLICATIONS

R. Qi, D. Li, L. Zhang, Y. Huang. "Experimental study on electrolytic dehumidifier with polymer electrolyte membrane for air-conditioning systems" Energy Procedia 142 (Dec. 2017)—9th International Conference on Applied Energy—ICAE2017. pp. 1908-1913 (Year: 2017).*
Extended European Search Report for EP Application No. 19195659.8, dated Jan. 21, 2020, pp. 6.

* cited by examiner

*Primary Examiner* — J. Christopher Ball
(74) *Attorney, Agent, or Firm* — Kinney & Lange, P. A.

(57) ABSTRACT

A system for fuel tank inerting includes a humid on-board inert gas generating system coupled with a proton exchange membrane dryer. The on-board inert gas generating system produces humid inert gas, which is dried by the proton exchange membrane dryer prior to use in a fuel system for inerting.

18 Claims, 6 Drawing Sheets

ELECTROCHEMICAL DRYING OF HUMID INERT GAS FOR FUEL TANK INERTING

BACKGROUND

This application relates generally to inert gas production and specifically to fuel tank inerting systems.

Fuel tanks can contain potentially combustible combinations of oxygen, fuel vapors, and ignition sources. In order to prevent oxidation of fuel in aircraft fuel tanks, commercial aviation regulations require actively managing the risk of explosion in ullage of fuel tanks; this is typically accomplished by decreasing the oxygen partial pressure in the ullage in fuel tanks to less than 12%, or less than 9% for military vehicles.

The technology readiness of catalytic oxidation or electrochemical methods for fuel tank inerting have improved such that they are under consideration for replacement of hollow fiber membranes in air separation modules. However, these methods produce humid inert gas, which should be dried prior to introduction to a fuel tank.

SUMMARY

In a first embodiment, a fuel tank inerting system includes an inlet for taking in process air, an on-board inert gas generating system for converting the process air to inert gas, a proton exchange membrane dryer, and an outlet for receiving the dried inert gas from the anode and expelling the dried inert gas. The proton exchange membrane dryer includes a cathode for receiving the process air from the inlet and directing the process air to the on-board inert gas generating system and an anode for receiving and drying the inert gas from the on-board inert gas generating system to produce dried inert gas, so that the dried inert gas contains no more than five grams of water per kilogram of inert gas.

In a second embodiment, a method of fuel tank inerting includes flowing process air to an on-board inert gas generating system, producing inert gas with the on-board inert gas generating system, drying the inert gas with a proton exchange membrane dryer to produce dried inert gas having no more than five grams of water per kilogram of inert gas, and inerting a fuel tank with the dried inert gas.

DETAILED DESCRIPTION

Inert gas for fuel tank inerting (FTI) produced through electrochemical methods such as proton exchange membranes or solid oxide fuel cells should be dried to avoid microbial growth and freezing within the fuel tanks. Proton exchange membrane (PEM) devices can regulate humidity in enclosures and in buildings. The use of PEM dryer devices in combination with electrochemical FTI devices allows for the simultaneous regulation of oxygen and humidity in aircraft.

Figure 1:
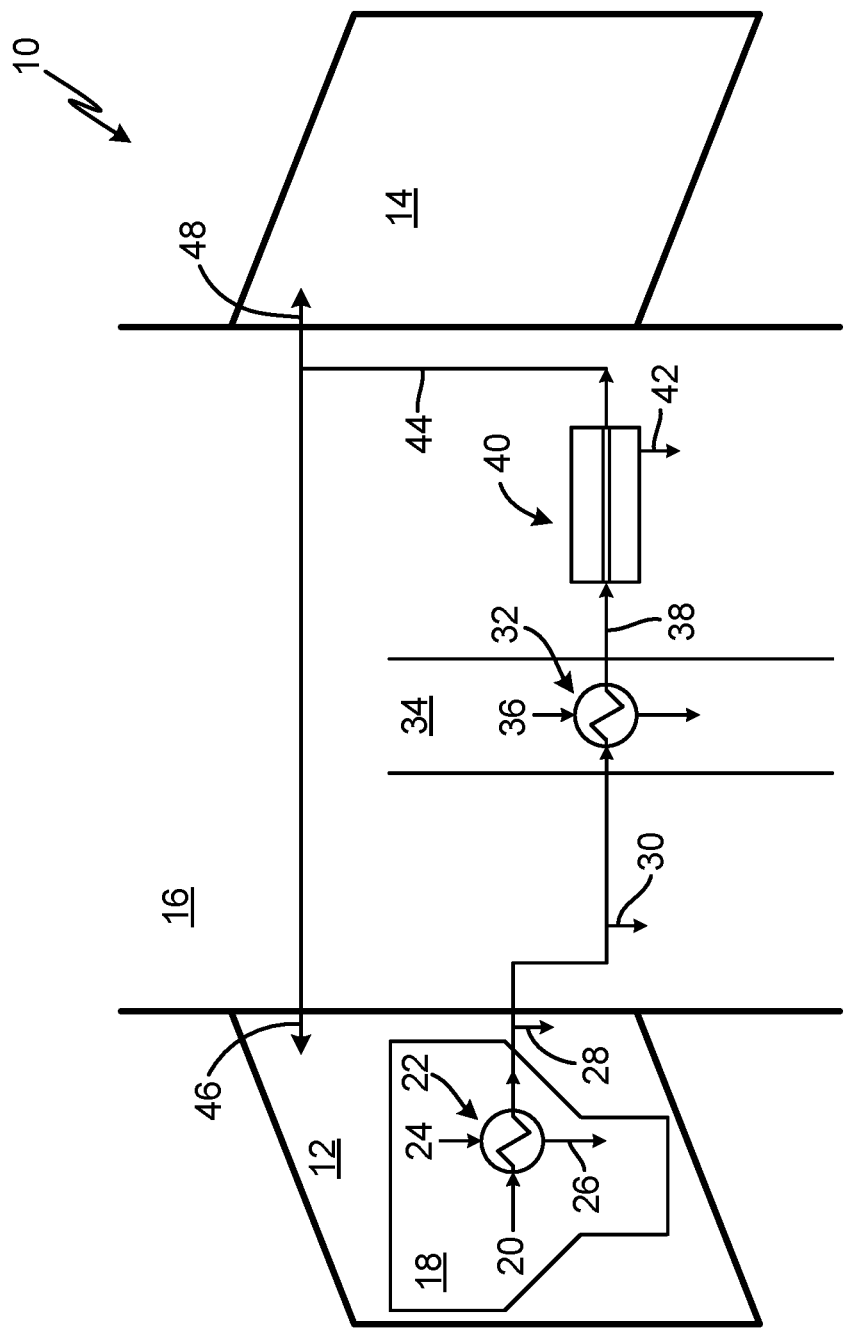
FIG. 1 is a schematic diagram of a prior art fuel tank inerting system for aircraft.

FIG. 1 is a schematic diagram of prior art fuel tank inerting system 10 for aircraft. System 10 includes wings 12, 14, fuselage 16, engine 18 (including bleed air inlet 20, pre-cooler 22, and fan air 24), bleed air line 26, wing outlet 28, environmental control system (ECS) outlet 30, heat exchanger 32, ram duct 34, ram air 36, air separation line 38, air separation module (ASM) 40, permeate outlet 42, dry inert gas line 44, and outlets 46, 48. System 10 spans wings 12, 14, and fuselage 16 on an aircraft.

In system 10, bleed air from engine 18 runs from bleed air inlet 20 through pre-cooler 22, where it is temperature controlled by fan air 24. Once cooled, bleed air runs through bleed air line 26 towards ASM 40. As bleed air runs through bleed air line 26, portions of bleed air exit through wing outlet 28 for de-icing, and through ECS outlet 30 for aircraft pressurization and for control of the aircraft environment.

Prior to reaching ASM 40, bleed air runs through fuel tank inerting (FTI) heat exchanger 32 located in ram duct 34, where bleed air is further temperature controlled by introduction of ram air 36. Temperature controlled air is run down air separation line 38 to ASM 40, which is capable of separating the incoming air to inert gas and oxygen-enriched air through a plethora of hollow fiber membranes, producing dry inert gas.

Produced oxygen-enriched air exits through permeate outlet 42, and is typically dumped overboard. Inert gas runs from ASM 40 through dry inert gas line 44 towards outlets 46, 48, where it can then be directed to inert fuel tanks.

Traditional membrane based air separation modules, like prior art system in FIG. 1, present a number of challenges. The service life of the membrane modules does not always meet expectations. Unexpected replacements increase maintenance costs for airlines. In addition, the air separation modules tend to be bulky, which makes it difficult to increase capacity on extended range aircraft. For these reasons, a lower cost alternative is needed.

Conventional gas separation membranes (such as ASM 40) generate inert gas and simultaneously dry the inert gas. However, when used with a low pressure bleed air system, the ASM dryers must be large due to a low pressure head, increasing weight and bulk. A proton exchange membrane (PEM) dryer, such as the version discussed below, avoids these disadvantages.

Figure 2:
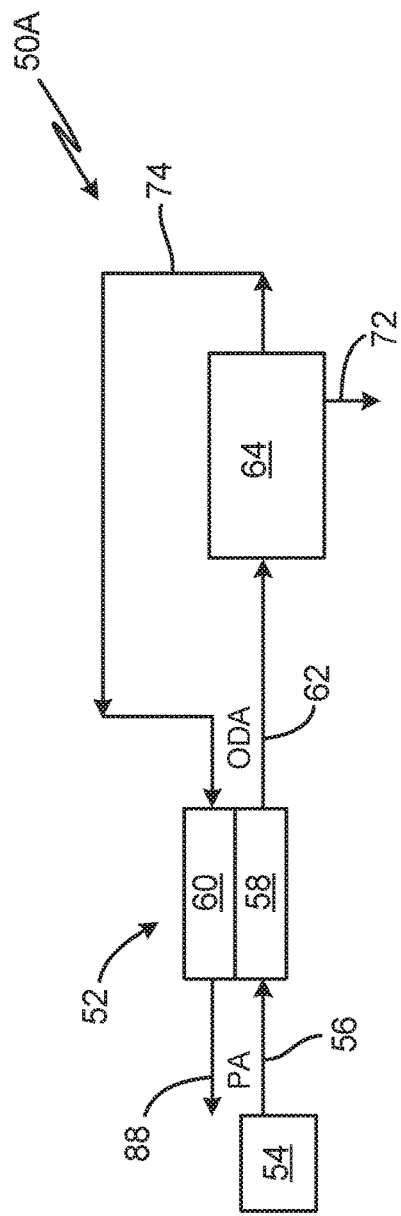
FIG. 2 is a schematic diagram of a fuel tank inerting system for aircraft containing a PEM dryer.

FIG. 2 is a schematic diagram of fuel tank inerting system 50A for aircraft containing proton exchange membrane (PEM) dryer 52. System 50A includes air source 54, inlet air line 56, PEM dryer 52 with cathode 58 and anode 60, humid mildly oxygen-depleted air (ODA) line 62, humid on-board inert gas generating system (OBIGGS) 64, humid inert gas line 74, and dry inert gas line 88. In system 50A, air runs from air source 54, through inlet air line 56, through cathode side 58 of PEM dryer 52, through mild ODA line 62 to humid OBIGGS 64, through line 74 to anode side 60 of PEM dryer 52, and out line 88 to fuel tanks requiring inerting.

Air source 54 produces process air (PA) that is run through inlet air line 56 into system 50A. Air source 54 can be, for example bleed air, compressed air, ambient air, or other appropriate air sources. If bleed air is used, both high pressure and low pressure bleed air can be used in system 50A with PEM dryer 52.

From air source 54, PA runs through inlet air line 56 to cathode side 58 of PEM dryer 52, where water is transferred from anode side 60 into PA running through cathode side 58. In cathode side 58 of PEM dryer 52, PA is converted to humid, mildly oxygen depleted air (ODA), but not fully inert gas. Humid ODA runs through mild ODA line 62 to humid OBIGGS 64.

OBIGGS 64 receives humid ODA from mild ODA line 62, and removes oxygen from the humid ODA to produce humid inert gas for fuel tank inerting. Under standard conditions, an inert gas with less than 15% oxygen will suppress a fire, but allow smoldering. At less than 12% oxygen, smoldering ceases. Thus, for fuel tank inerting, OBIGGS 64 must produce inert gas with less than 12% oxygen for commercial aircraft, and preferably less than 9% oxygen for military applications. These limits change with altitude.

OBIGGS 64 can be, for example, a catalytic oxidation device or an electrochemical device (fuel cells or electrolyzing gas separators). Examples of OBIGGS are discussed in reference to FIGS. 4-7. These types of inert gas production devices can produce inert gas (e.g., nitrogen enriched air (NEA)) with an oxygen content of less than 11% oxygen, or less than 8% oxygen (for military aircraft), but the produced inert gas is humid. Humidity in inert gas may condense, freeze, and occlude the fuel system in an aircraft. An ice blockage in the fuel system can impede fuel delivery to the engines resulting in engine stall and in potentially significant damage to the aircraft.

Produced humid inert gas from OBIGGS 64 runs through humid inert gas line 74 to be dried prior to insertion in fuel tanks. A variety of drying methods are known in prior art. For example, a water condenser alone is insufficient, even at the freezing point at sea level and atmospheric pressure; too much water slips through a condenser and could ultimately freeze in the fuel tanks (discussed in more detail with reference to FIG. 3). Similarly, using gas separation membranes for final drying in impractical, as traditional gas separation membranes are too large without a large pressure head (which is typically unavailable due to low bleed pressure at idle or near idle engine operation such as during descent). Other drying mechanisms such as desiccant wheels are too large and heavy. The proposed PEM avoids these challenges.

PEM dryer 52 removes humidity from inert gas generated by OBIGGS 64. PEM dryer 52 contains cathode side 58 and anode side 60. PEM dryer 52 can be a single cell or a stack of cells arranged in series, or several stacks of cells arranged in parallel. PEM dryer 52 can be used alone or in combination with a condenser, as discussed with reference to FIG. 3. Typically, PEM dryer 52 must produce gas that has no more than five grams of water per kilogram of inert gas, and preferably gas with no more than two grams of water per kilogram of inert gas.

PEM dryer 52 removes humidity from inert gas generated by OBIGGS 64 for the purpose of fuel tank inerting. PEM dryer 52 is an electrochemical stack that electrolyzes water vapor at anode side 60 due to an applied voltage. Water is removed according to the following equation in anode side 60:

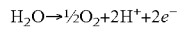
$$H_2O \rightarrow \tfrac{1}{2}O_2 + 2H^+ + 2e^-$$

Meanwhile, water is generated on cathode side 58 according to the following equation:

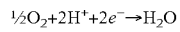
$$\tfrac{1}{2}O_2 + 2H^+ + 2e^- \rightarrow H_2O$$

During operation of PEM dryer 52, humid inert gas from OBIGGS 64 is introduced to anode side 60 of PEM dryer 52. In anode side 60, water vapor electrolyzes, forming protons, oxygen molecules, and electrons. The protons are transported through the polymer electrolyte within PEM dryer 52. The reactions on either side of PEM dryer 52 are related by the stoichiometry of the electrode reactions.

In system 50A, this effectively "moves" water across PEM dryer 52 from anode side 60 to cathode side 58, recycling water from humid inert gas. In system 50A, process air is routed through cathode side 58 of PEM dryer 52 prior to entering OBIGGS 64. At cathode side 58, electrons and protons from anode side 60 combine with oxygen from the process air to form humid oxygen-depleted air. Oxygen-depleted air is only mildly depleted of oxygen and is not inert; but requires further removal of oxygen to become inert.

The oxygen generated at anode side 60 increases the oxygen content of the inert gas. Thus, humid OBIGGS 64 upstream of PEM dryer 52 must be operated to compensate for this increase in oxygen in PEM dryer 52. For this reason, OBIGGS 64 must produce inert gas with an oxygen content lower than is required for fuel tank inerting.

Once inert gas is dried in PEM dryer 52, it exits anode side 60 of PEM dryer 52. Dry inert gas line 88 transports dried inert gas out of PEM dryer 52 towards fuel tanks or other locations requiring dried inert gas.

Inert gas is dried so that inert gas entering a fuel tank has less than 5 grams of water per kilogram of inert gas. Preferably, inert gas entering a fuel tank has less than 2 grams of water per kilogram of inert gas. This low amount of water should not cause problems in the aircraft fuel system.

Figure 3:
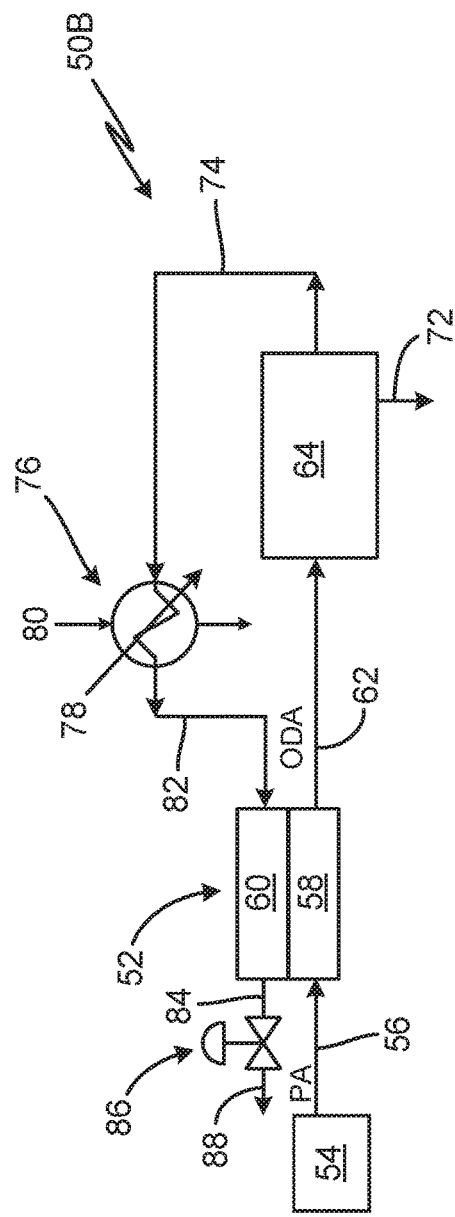
FIG. 3 is a schematic diagram of a fuel tank inerting system for aircraft containing a PEM dryer and a condenser.

FIG. 3 is a schematic diagram of fuel tank inerting system 50B for aircraft containing PEM dryer 52 and condenser 76. System 50B contains many of the same components as system 50A in FIG. 2, connected in the same fashion. System 50B includes compressed air source 54, inlet air line 56, PEM dryer cathode side 58, humid mild ODA line 62, humid OBIGGS 64, humid inert gas line 74, condensing heat exchanger 76 (with cold sink flow 80 and water outlet 78), condensed inert gas line 82, PEM dryer anode side 60, dried inert gas line 84, pressure regulator 86, and outlet 88.

In system 50B, process air enters from compressed air source 54 through inlet line 56, is transported through cathode side 58 of PEM dryer 52, and runs down line 62 to humid OBIGGS 64. Exiting OBIGGS 64, humid inert gas transports through line 74 to condensing heat exchanger 76, where some water is condensed out. Condensed inert gas then transports through line 82 to anode side 60 of PEM dryer 52, where inert gas is further dried. Dried inert gas runs through pressure regulator 86 and out line 88 an outlet, where it is directed to fuel tanks or other locations requiring inerting.

System 50B contains many of the same components, connected in the same fashion as system 50A in FIG. 2. Thus, only compressed air source 54, condensing heat exchanger 76 and pressure regulator 86 will be discussed in detail.

Compressed air source 54 provides condensed air into system 50B. Pressurized operation is beneficial because compressed gases hold less water vapor, resulting in a smaller required size of condensing heat exchanger 76 and PEM dryer 52. For pressurized operation, compressed air source 54 can be from any suitable source, such as bleed air from an engine compressor stage, or compressed air from a dedicated compressor. Alternatively, low pressure operation using relatively low pressure bleed air or ram air can be accomplished with the appropriate hardware.

Ambient air during cruise is sub-freezing. Compression of ambient air creates a rise in temperature, allowing ambient air for use in system 50B without causing a multitude of issues associated with freezing gases.

Condensing heat exchanger 76 receives humid inert gas from OBIGGS 64. Humid inert gas can be partially dried by condensing heat exchanger 76. Condensing heat exchanger 76 removes water with less energy than an electrochemical device. However, condensing heat exchanger 76 cannot operate below freezing.

Inert gas should preferably be dried to 2 grams of water per kilogram of inert gas, or a water mole fraction of 0.0032, which corresponds to a sub-freezing dew point. But condensing heat exchanger 76 operation is limited to temperature above the freezing point of water for practical reasons. For example, condensing heat exchanger 76, operating near the freezing point of water, may still hold considerable moisture. Preferably, heat exchanger 76 operates well above the freezing point of water in order to avoid the possibility of blocking flow through heat exchanger 76. Quantitatively, the water mole fraction of saturated air at 0.01 degrees Celsius is about 0.0059 at sea level. This is still substantially higher than the desired water mole fraction of 0.0032. Thus, condensing heat exchanger 76 functioning above the freezing point of water produces inert gas with a saturated water content exceeding dryness requirements by almost a factor of two. Thus, condensing heat exchanger 76, while useful in removing some humidity from inert gas, is not alone sufficient to dry inert gas. A second drying mechanism, such as PEM dryer 52, is needed downstream of condensing heat exchanger 76.

Figure 8:
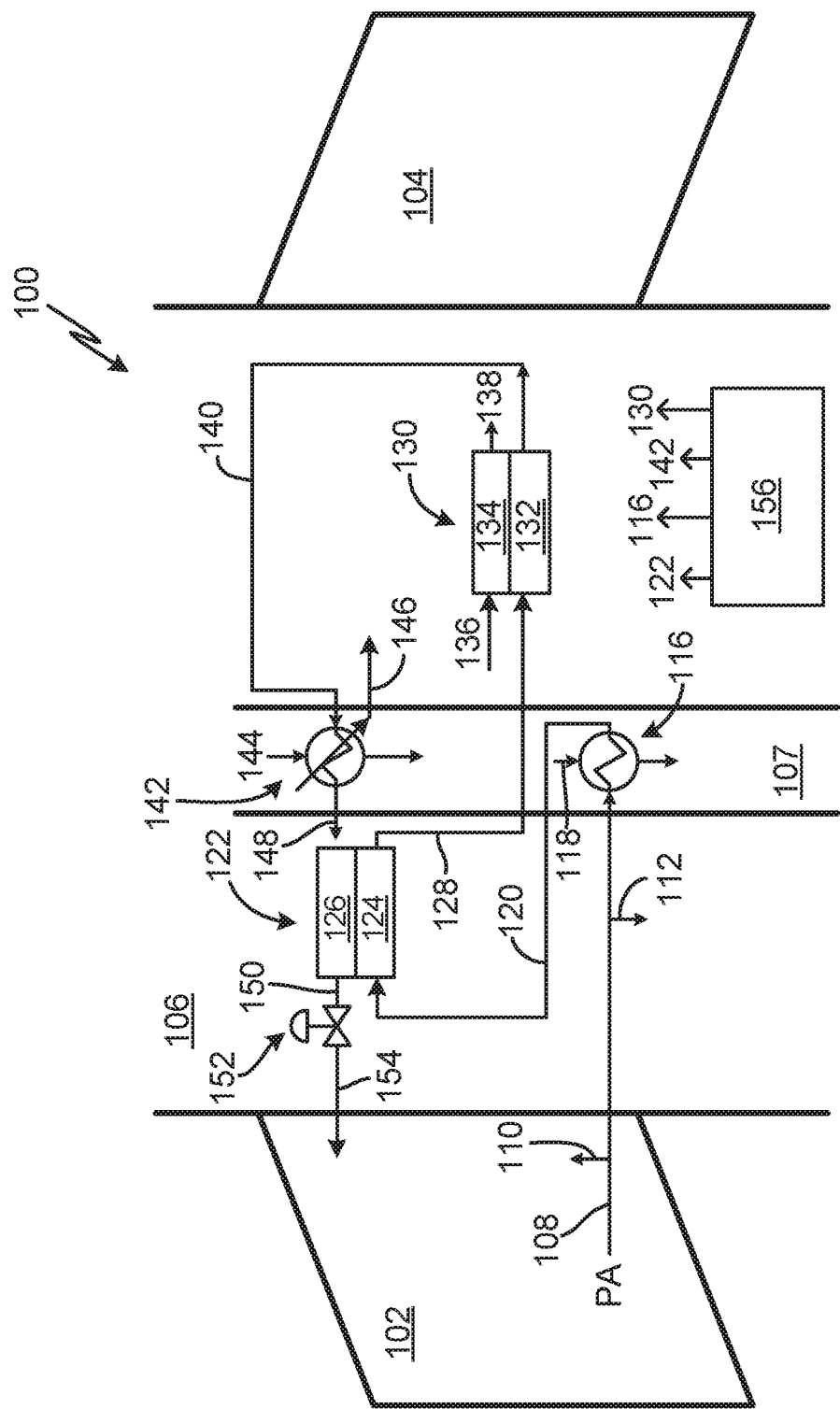
FIG. 8 is a schematic diagram of a fuel tank inerting system for aircraft with a PEM OBIGGS.
Figure 9:
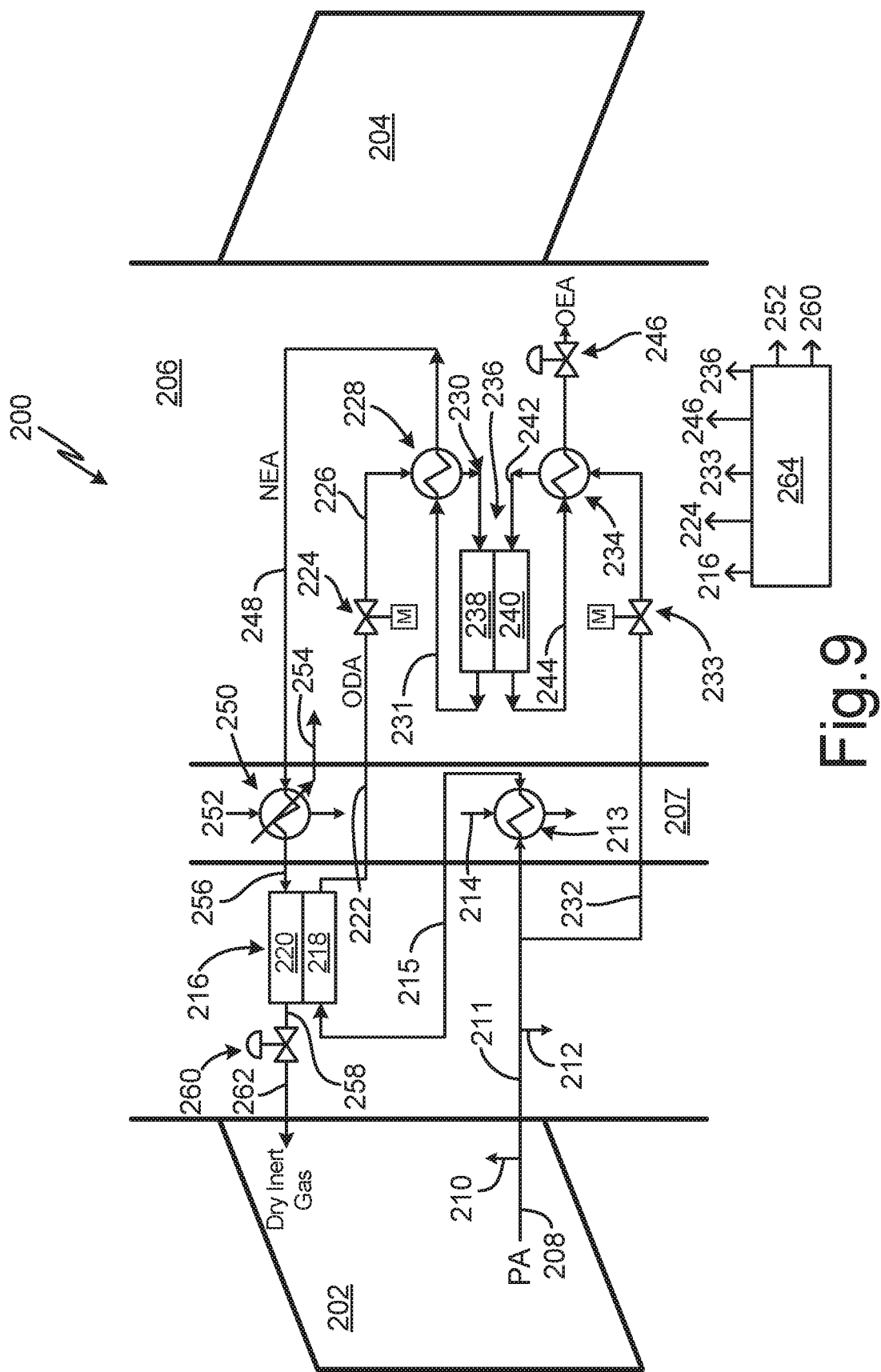
FIG. 9 is a schematic diagram of a fuel tank inerting system for aircraft with a solid oxide OBIGGS.
Figure 10:
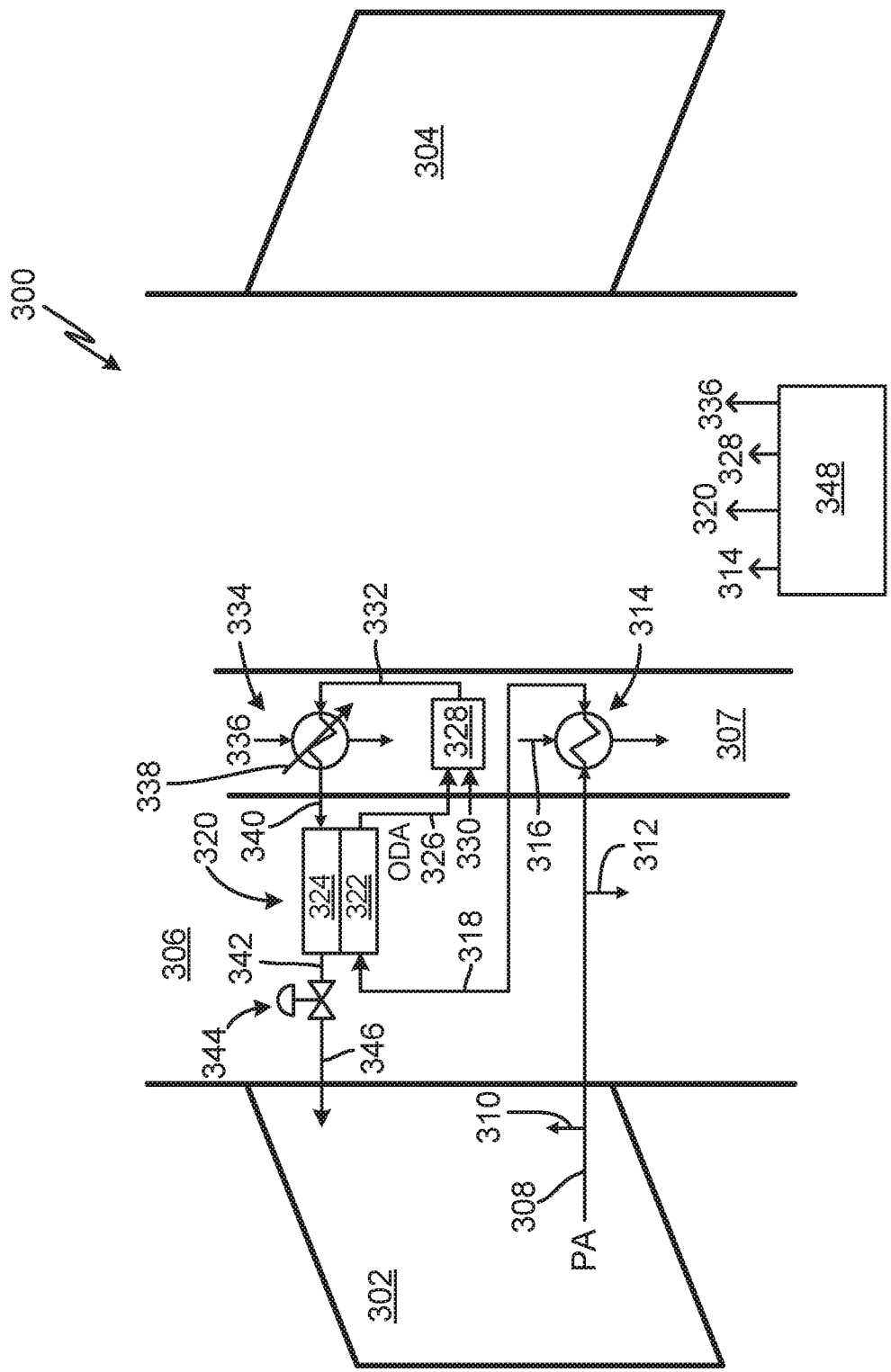
FIG. 10 is a schematic diagram of a fuel tank inerting system for aircraft with a catalytic oxidation OBIGGS.

Condensing heat exchanger 76 is supported by cold sink flow 80. At altitude, ram air is a readily available source for cold sink flow. When ram air is used for cold sink flow 80, condensing heat exchanger 76 should be located first within the ram air duct to be exposed to the coldest ram air flow and thus remove the highest amount of water. This is shown in FIGS. 8-10.

However, when cold sink air 80 is ram air, condensing heat exchanger 76 must be continually monitored or designed such that at sub-freezing ambient conditions such as at high altitude to ensure its operating temperature does not drop below freezing. This can be achieved by restricting or bypassing the cold sink flow around condensing heat exchanger 76 during below-freezing conditions, either partially or completely.

On the ground, ambient air may not be cold enough to sufficiently remove humidity from the inert gas, so an alternative cold sink such as chilled air from an air cycle machine or a vapor compression cycle or other source can be used for cold sink flow 80 instead of ram air.

In system 50B, inert gas from condensing heat exchanger 76 cools PEM dryer 52. PEM dryer 52 generates heat from electrolysis reactions. This heat is removed by condensed inert gas from condensing heat exchanger 76 running through cathode side 58 of PEM dryer 52. In this way, PEM dryer 52 acts as a heat exchanger, with gas streams in anode side 60 and cathode side 58 exchanging heat. In some embodiments, PEM dryer 52 can be equipped with a subsystem for thermal management, to allow heating or cooling of PEM dryer 52.

Pressure regulator 86 allows for pressurized operation of system 50B. Pressure regulator 86 is a back pressure regulator that prevents loss of pressure within system 50B. Sufficiently pressurized operation of system 50B raises the dew point of gases above freezing. This assists with drying of gas in system 50B by allowing a higher temperature cold sink to be used. Such a higher temperature cold sink may avoid freezing gases within system 50B. Alternatively, a throttle such as a valve or orifice can be used to maintain system 50B pressure. In another embodiment, a turbine can hold pressure in system 50B, and extract work from and cool the oxygen-depleted air stream.

The pressure of process air in systems 50A and 50B (bleed air in an aircraft engine) is a function of many factors including engine speed, ambient air conditions, and blade tip clearance among others. During high throttle conditions such as takeoff and climb, the engine compresses process air to a sufficient pressure for cabin pressurization, for environmental control system operation, and for use in a conventional fuel tank inerting system air separation module, however, during descent the pressure may not be sufficient. During this mission phase, the engine may need to be throttled forward in order to generate enough pneumatic pressure for the operation of subsystems. The benefit of the humid OBIGGS in systems 50A and 50B, such as an electrochemical or catalytic oxidation unit, is that their ability to generate inert gas is not directly dependent on the pressure generated by an engine compressor stage. The operation of a humid OBIGGS benefits from pressure in terms of size and weight, however, they are more tolerant of operation at low pressure because they are not dependent on a pressure gradient to function properly. Thus, the low pressure of process air (bleed air) during a typical mission is less of a concern for the humid OBIGGS systems than for conventional air separation modules.

FIGS. 4-7 are schematic diagrams of various humid OBIGGS, including electrochemical systems. PEM dryers, such as PEM dryer 52 of FIG. 2 and FIG. 3, can be used in conjunction with a variety of OBIGGS, including electrochemical gas generators and catalytic oxidation units. These types of OBIGGS generate humid inert gas that must be dried prior to fuel tank inerting.

Figure 6:
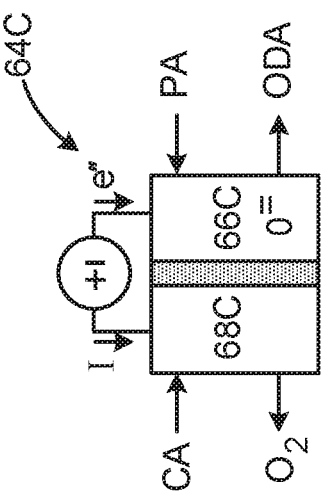
FIG. 6 is a schematic diagram of a solid oxide electrolyzing gas separator.
Figure 7:
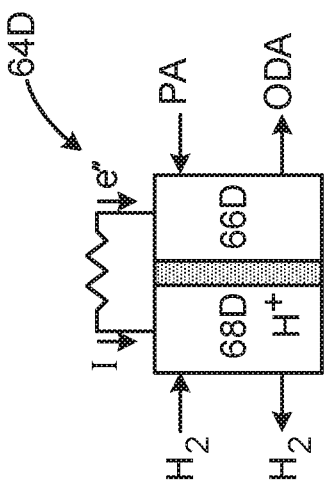
FIG. 7 is a schematic diagram of a solid oxide fuel cell.
Figure 4:
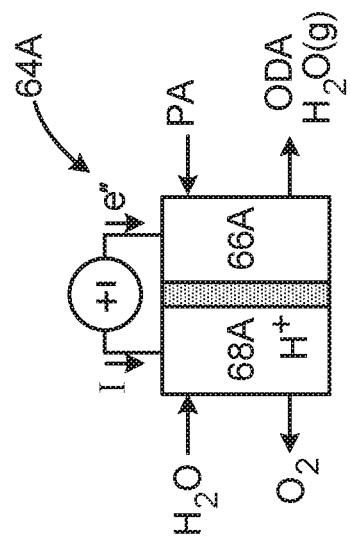
FIG. 4 is a schematic diagram of a proton exchange membrane electrolyzing gas separator.

Each humid OBIGGS shown in FIGS. 4-7 is an alternative to traditional air separation membrane modules, and may produce inert gas containing water. Electrochemical inert gas generators (IGGs) can be, for example, a fuel cell (FIG. 5, 7) or an electrochemical gas separator (FIGS. 4, 6). Example of these devices include proton exchange membranes (PEM) (FIGS. 4, 5), or solid oxide devices (FIGS. 6, 7). In contrast to catalytic oxidation and PEM inert gas generators, solid oxide devices do not generate water in the inert gas stream (cathode), however, process air may contain humidity or combustible vapors resulting in humid inert gas. Alternative fuel cells and electrochemical gas separators can also be used.

FIG. 4 is a schematic diagram of proton exchange membrane electrolyzing gas separator 64A. Gas separator 64A includes cathode 66A and anode 68A. All PEM devices generate humid inert gas at cathode 66A. In electrolyzing gas separator 64A, electric power is supplied in the form of a voltage source which causes the flow of electrons $e^-$.

Anode 68A electrolyzes water to produce oxygen, hydrogen, and electrons according to the following reaction:

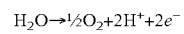

$$H_2O \rightarrow \tfrac{1}{2}O_2 + 2H^+ + 2e^-$$

The protons produced in anode 68A migrate across the electrolyte membrane to cathode 66A. The reactions at anode side 68A of PEM devices differ based on the source of protons $H^+$ (e.g., water or hydrogen).

Cathode 66A intakes process air (PA) (or mildly oxygen-depleted air as in FIGS. 2-3), and along with the protons from anode 68A and supplied electrons, produces inert oxygen-depleted air (ODA) and water vapor according to the following reaction:

$$\tfrac{1}{2}O_2 + 2H^+ + 2e^- \rightarrow H_2O$$

Overall, electrolyzing gas separator 64A consumes electric power and intakes air and water to produce two separate gas streams: oxygen and humid oxygen-depleted air.

Figure 5:
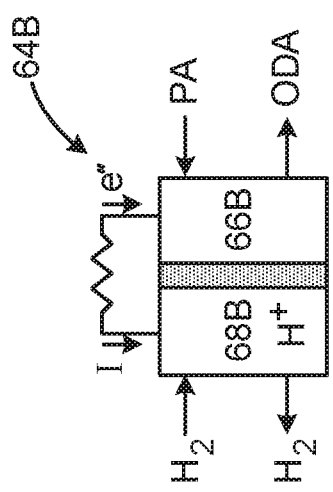
FIG. 5 is a schematic diagram of a proton exchange membrane fuel cell.

FIG. 5 is a schematic diagram of proton exchange membrane fuel cell 64B. Similar to gas separator 64B in FIG. 4, fuel cell 64B is a PEM based system. Fuel cell 64B includes cathode 66B and anode 68B. Fuel cell 64B produces electricity.

Anode 68B is the site of hydrogen oxidation which yields protons and electricity according to the following reaction:

$$H_2 \rightarrow 2H^+ + 2e^-$$

Anode 68B outputs unreacted hydrogen which may be recycled into the inlet of anode 68B using an ejector or a blower as known to those skilled in the art. The protons migrate across the membrane to react in cathode 66B.

Cathode 66B intakes process air (PA) and combines oxygen and protons to produce humid oxygen-depleted air (ODA) according to the following reaction:

$$\tfrac{1}{2}O_2 + 2H^+ + 2e^- \rightarrow H_2O$$

Overall, fuel cell 64B generates direct current electricity and produces humid ODA.

FIG. 6 is a schematic diagram of solid oxide electrolyzing gas separator 64C. Solid oxide electrolyzing gas separator 64C includes cathode 66C and anode 68C. Unlike PEM devices in FIGS. 4-5, solid oxide devices move oxygen ions across a membrane instead of protons. Solid oxide electrolyzing gas separator 64C requires an input of electricity.

In gas separator 64C, cathode 66C takes in process air (PA) and splits incoming oxygen into oxygen ions according to the following equation:

$$\tfrac{1}{2}O_2 + 2e^- \rightarrow O^=$$

Cathode 66C produces oxygen-depleted air. The oxygen ions migrate over the membrane to anode 68C.

Anode 68C produces oxygen and electrons from the oxygen ions, according to the following equation:

$$O^= \rightarrow \tfrac{1}{2}O_2 + 2e^-$$

Additionally, cooling air (CA) can be run into anode 68C to temperature regulate gas separator 64C. Overall, gas separator 64C takes in PA (and possible CA), and produces two gas streams: oxygen and oxygen-depleted air.

FIG. 7 is a schematic diagram of solid oxide fuel cell 64D. Fuel cell 64D includes cathode 66D and anode 68D. Fuel cell 64D produces electricity in the form of electrons.

In fuel cell 64D, cathode 66D takes in PA and produces ODA. Specifically, cathode 66D splits oxygen according to the following reaction:

$$\tfrac{1}{2}O_2 + 2e^- \rightarrow O^=$$

The produced oxygen ions migrate across the membrane to anode 68D.

Anode 68D takes in hydrogen in addition to the oxygen ions and produces water according to the following reaction:

$$H_2 + O^= \rightarrow H_2O + 2e^-$$

The produced water (in addition to unreacted hydrogen) exits anode 68D. Overall, fuel cell 64D takes in PA and hydrogen, and produces ODA and humidity.

Alternatively, a catalytic oxidation unit, such as unit 328 in FIG. 10, can be used. Catalytic oxidation units take in jet fuel and air to produce inert product gas. Jet fuel includes a plethora of chemical compounds including paraffins (straight, branched, cyclic), aromatics (mono and poly), and species containing both saturated and unsaturated rings. Because every sample of jet fuel is different in composition and consists of hundreds if not thousands of species, a representative compound, dodecane, is used to illustrate the generation of inert gas via catalytic combustion. The lean combustion of dodecane proceeds according to the following reaction:

$$C_{12}H_{26} + (37/2 + X)(O_2 + 3.76N_2) \rightarrow 13H_2O + 12CO_2 + XO_2 + (37/2 + X)^*(3.76)N_2$$

(Where X=moles of $O_2$ in product gas per mole of dodecane). A catalytic oxidation unit has many other features that differentiate themselves from electrochemical devices. For example, a catalytic oxidation unit may feature a fuel injector, vaporizer, nozzle, or atomizer in order to assist with the combustion reactions (discussed more with reference to FIG. 10). Ancillary components such as a sulfur removal device may treat the fuel upstream of the unit in order to avoid catalyst deactivation.

Any of the electrochemical systems discussed with reference to FIGS. 4-7 can be used to produce inert gas (ODA) for fuel tank inerting. However, these devices do not produce dry inert gas whereas humidity should be removed prior to introduction of the inert gas into a fuel tank.

FIGS. 8-10 are schematic diagrams of varying embodiments of fuel tank inerting systems with humid OBIGGS and PEM dryers. OBIGGS exhibited in FIGS. 8-10 include PEM devices, solid oxide devices, and catalytic oxidation units. All of these types of OBIGGS produce inert gas that can contain water. In an electrochemical system, a plurality of electrochemical cells are typically arranged in series in a stack via interconnects or bipolar plates as known to those skilled in the art. In FIGS. 8-10, a single anode or cathode can represent the plurality anodes and cathodes of a stack for simplicity.

FIG. 8 is a schematic diagram of fuel tank inerting system 100 for aircraft with PEM OBIGGS 130. System 100 is located within wings 102, 104, fuselage 106, and ram air duct 107. System 100 includes system inlet 108, outlet to wings 110, outlet to environmental control system (ECS) 112, heat exchanger 116 with cooling air flow 118, temperature controlled air line 120, PEM dryer 122 with cathode side 124 and anode side 126, mildly oxygen depleted line 128, PEM OBIGGS 130 with cathode side 132 and anode side 134, anode inlet 136 and outlet 138, humid inert gas line 140, condenser 142 with cooling air line 144 and water line 146, condensed inert gas line 148, dried inert gas line 150, pressure regulator 152, and system outlet 154.

In the aircraft, system 100 is situated throughout wings 102, 104, fuselage 106, and ram air duct 107. Wings 102 houses system inlet 108 and outlet to wings 110. Inlet 208 can receive process air (PA) from a variety of sources, for example, bleed air or other compressed air. Outlet to wings 110 allows a portion of this process air to be used on wing 102 for ice protection or other purposes.

Fuselage 106 houses the majority of the components in system 100. Ram air duct 107, which can be central to fuselage 106, may house one or more heat exchangers (such as heat exchanger 116) or condensers (such as condenser 142) that may use ram air as cooling air.

Process air (PA) from system inlet 108 runs towards fuselage 106 from wing 102, where a majority of PA exits through outlet 112 to the aircraft ECS. A much larger portion of air is required to run aircraft ECS (e.g., maintain pressure, temperatures and environment in aircraft cabins, cockpit, and other areas), than is required for system 100. The remaining PA runs through inlet 108 to heat exchanger 116.

Heat exchanger 116, located in ram air duct 107, allows for temperature regulation of PA prior to PA passing through cathode side 124 of PEM dryer 122, in addition to temperature conditioning PA prior to entrance into PEM OBIGGS 130. PA is cooled by cooling air flow 118, which can be, for example, ram air. Temperature conditioned PA is then run through temperature controlled process air line 120 towards cathode side 124 of PEM dryer 122.

As discussed with reference to FIGS. 2-3, PA running through cathode side 124 receives water from anode side 126 of PEM dryer 122. PA is also mildly depleted of oxygen passing through PEM Dryer 122 cathode side 124, producing humid mildly oxygen depleted air that exits through mildly oxygen depleted line 128 towards PEM OBIGGS 130.

Examples of PEM OBIGGS 130 are discussed in detail with reference to FIGS. 4-5. PEM OBIGGS 130 can be a fuel cell or an electrolyzing gas separator. Humid mildly oxygen depleted air enters PEM OBIGGS 130 on cathode side 132, which produces humid inert gas exiting through line 140. A flow of fluid, either water for an electrolyzing gas separator or hydrogen gas for a fuel cell, is supplied to anode side 134 via lines 136, 138, as needed.

If OBIGGS 130 is an electrolyzing gas separator, electricity must also be supplied to OBIGGS 130, and oxygen enriched air exits anode side 134 in addition to humid inert gas exiting cathode side 132.

If OBIGGS 130 is a fuel cell, electricity is produced and unreacted hydrogen may exit anode side 134 in addition to humid inert gas exiting cathode side 132. When a fuel cell type PEM device such as OBIGGS 130 is used in fuel tank inerting system 100, the fuel cell can provide electric power to PEM dryer 122 for operation.

PEM devices such as a fuel cell and a gas separator require membrane hydration to function properly. PEM fuel cells and electrolyzing gas separators function better when gases are humid, thus, use of a PEM device such as OBIGGS 130 in conjunction with PEM dryer 122 helps maintain water balance of the system.

Humid inert gas line 140 routes humid inert gas from OBIGGS 130 to condenser 142. Condenser 142, located in ram duct 107, condenses water out line 146 from humid inert gas in humid inert gas line 140 via cooling air in cooling air line 144. The function of condenser 142 is discussed in detail with reference to FIG. 3.

When used with condenser 142, PEM Dryer 122 acts as a heat exchanger. The cooled inert gas from condenser 142 that enters PEM Dryer 122 anode side 134 acts as a heat sink for the incoming process air on cathode side 132. This is beneficial when used with PEM OBIGGS 130 downstream, because it assists with thermally management of PEM OBIGGS 130. As a result, PEM OBIGGS 130 can operate at a lower temperature, which results in less water vapor leaving PEM OBIGGS 130, which reduces the inert gas drying load.

Condensed inert gas exits condenser 142 out condensed inert gas line 148 and flows towards anode side 126 of PEM dryer 122. In anode side 126 of PEM dryer 122, condensed inert gas is further dried to produce dried inert gas. In PEM dryer 122, water is effectively transported from the anode to the cathode. Water electrolysis results in the depletion of water in anode 126. Protons cross from anode side 126 to cathode side 124 and joins electrons and temperature controlled process air flowing through cathode side 124 in order to form water. This is discussed in more detail with reference to FIG. 2.

Dried inert gas exits PEM dryer out line 150, through pressure regulator 152, and out system outlet 154, where dried inert gas can be routed to fuel tanks for inerting.

System 100 also includes controller 156, which can be in communication with heat exchanger 116, PEM dryer 122, OBIGGS 130, and condenser 142. Controller 156 may be located elsewhere in the aircraft, but can communicate with and control function of components 116, 122, 130, and 142 according to flight conditions.

Controller 156 can include one or more processors and computer-readable memory encoded with instructions that, when executed by the one or more processors, cause controller 156 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller 156 can be configured to store information within controller device 156 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 156 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories. Controller 156 can be a stand-alone device dedicated to the operation of the catalytic oxidation unit, or it can be integrated with another controller.

FIG. 9 is a schematic diagram of fuel tank inerting system 200 for aircraft with solid oxide OBIGGS 236. System 200 is located within wings 202, 204, fuselage 206, and ram air duct 207. System 200 includes inlet line 208, outlet to wings 210, inlet line 211, outlet to environmental control system (ECS) 212, FTI heat exchanger 213 with FTI heat exchanger cooling air stream 214, line to PEM dryer cathode side 215, PEM dryer 216 with cathode side 218 and anode side 220, lines and valve to cathode recovery heat exchanger 222, 224, 226, cathode recovery heat exchanger 228, line from cathode recovery heat exchanger to cathode of OBIGGS 230 line from cathode back to cathode recovery heat exchanger 231, line and valve from inlet to anode recovery heat exchanger 232, 233, anode recovery heat exchanger 234, solid oxide OBIGGS 236 with cathode 238 and anode 240, line from anode recovery heat exchanger to anode of OBIGGS 242, line from anode back to anode recovery heat exchanger 244, anode outlet and pressure regulator 246, humid inert gas line 248, condenser 250 with cooling air flow 252 and water flow 254, condensed inert gas line 256, dried inert gas line 258, pressure regulator 260, and system outlet 262.

System 200 has many of the same components, connected in the same fashion, as system 100 in FIG. 8. For this reason, only different components will be discussed herein.

System 200 features two heat recovery heat exchangers: cathode heat recovery heat exchanger 228 and anode heat recovery heat exchanger 234. The purpose of these heat exchangers is to preheat incoming process air in order to prevent thermal shock to the ceramic stack components and to cool the outgoing gas streams in order to avoid hazardous conditions by means of the exchange heat between the incoming and outgoing gas streams.

Cathode heat recovery heat exchanger 228 includes a first side and a second side. The first side receives mildly oxygen depleted air from line 226 while the second side simultaneously receives hot inert gas from cathode side 238 of solid oxide OBIGGS 236. Mildly oxygen depleted air is heated and exits out the first side through line 230 back towards solid oxide OBIGGS 236.

Meanwhile, hot inert gas from cathode side 238 of solid oxide OBIGGS 236 is cooled in the second side of cathode heat recovery heat exchanger 228 by exchanging heat with mildly oxygen depleted air. Cooled humid inert gas from cathode side 238 is routed down line 248 towards condenser 250 and PEM dryer 216. In this way, heat from gas exiting OBIGGS at a high temperature is recovered and used to heat incoming gas.

Anode heat recovery heat exchanger 234 includes a first side and a second side. The first side receives process air from line 232, while the second side simultaneously receives hot oxygen-enriched air from anode side 240 of solid oxide OBIGGS 236. Process air is cooled and exits out the first side through line 242 back towards solid oxide OBIGGS 236. Oxygen enriched air is routed through pressure regulator 246 and sent overboard. In this way, heat from gas exiting OBIGGS at a high temperature is recovered and used to heat incoming gas.

Cathode heat recovery heat exchanger 228 an anode recovery heat exchanger 234 are used with solid oxide OBIGGS 236 to preheat gas running through system 200. Solid oxide OBIGGS 236 must be run at a very hot temperature, thus, cool gas entering OBIGGS 236 is detrimental. Heat exchangers 228, 234 ensures gas is warm enough to prevent thermal shock with gas enters OBIGGS 236.

Alternatively, electrical heaters or a burner can be used to heat PA prior to entering solid oxide OBIGGS 236. With solid oxide devices, the electrolyte should operate between 800 and 1000 degrees Celsius for good kinetics of oxygen ion transport. The incoming gases should be within a prescribed margin of approximately 100 degrees Celsius at the inlet of the solid oxide device in order to avoid thermally shocking the device.

Valves 224, 233 control input of gas into heat exchangers 228 and 234, respectively, and ultimately input into OBIGGS 236. Valve 233 controls input of gas into anode heat recovery heat exchanger 234, while valve 224 controls input of gas into cathode heat recovery heat exchanger 228. Both valves allow for manipulation of OBIGGS 236 input, and thus amount of inert gas output. Pressure regulator 246 on the outlet of anode side 240 allows manipulation of the pressure of gases flowing through anode side 240.

OBIGGS 236 is a solid oxide device. OBIGGS 236 takes in mildly oxygen depleted air from cathode heat recovery heat exchanger 228 and converts it to inert gas, which is transported back through cathode heat recovery heat exchanger 228 to be cooled prior to being transported through line 248 towards condenser 250 and PEM dryer 216 for drying.

OBIGGS 236 can be, for example, an electrolyzing gas separator (see FIG. 6) or a fuel cell (see FIG. 7). Typically, the electrochemical cells constituting these devices would be used in a plurality, such as a stack of solid oxide devices connected in series. The solid oxide devices disclosed here rely on oxygen ion transport, however, proton-conducting solid oxide electrochemical devices are also envisioned. In both oxygen ion-conducting solid oxide electrochemical gas separator and fuel cells, water is not generated at the cathode. Humidity in the inert gas, whether from process air or any other source, will need to be removed downstream of solid oxide OBIGGS device 236 to the desired specification. In the case of oxygen ion-conducting solid oxide electrochemical inert gas generators, PEM dryer 216 alone may be sufficient without condenser 250.

For solid oxide fuel cells, cooling air cannot be used in cathode side 238, as this would re-introduce oxygen into inert gas exiting cathode side 238. This configuration can utilize anode recovery heat exchanger 234 to heat the incoming fuel. In this embodiment, cathode heat recovery heat exchanger 228 is integrated with solid oxide OBIGGS 236 stack. For solid oxide electrolyzing gas separators, temperature-regulated cooling air can be inputted into anode side 240 of OBIGGS 236.

System 200 also includes controller 264, which is in communication with PEM dryer 216, valves 224, 233, pressure regulators 246, 260, OBIGGS 236, and condenser 252. Controller 264 may be located elsewhere in the aircraft, but can communicate with and control function of components 216, 224, 233, 236, 246, 260, and 252 according to flight conditions.

FIG. 10 is a schematic diagram of fuel tank inerting system 300 for aircraft with catalytic oxidation OBIGGS 328. System 300 is located within wings 302, 304, fuselage 306, and ram air duct 307. System 300 includes system inlet 308, outlet to wings 310, outlet to environmental control system (ECS) 312, heat exchanger 314 with cooling air 316, temperature controlled process air line 318, PEM dryer 320 with cathode side 322 and anode side 324, mildly oxygen-depleted air line 326, catalytic oxidation OBIGGS 328 including fuel inlet 330, humid inert gas line 332, condenser 334 with cooling air 336 and water line 338, condensed inert gas line 340, dried inert gas line 342, pressure regulator 344, and system outlet 346.

System 300 has many of the same components, connected in the same fashion, as system 100 in FIG. 8. For this reason, only different components will be discussed herein.

In system 300, once cathode 322 (from PEM dryer 320) converts PA to humid mildly oxygen depleted air, the mildly oxygen depleted air is transported to catalytic oxidation unit 328. Fuel is inputted into catalytic oxidation unit 328. In catalytic oxidation unit, fuel and oxygen are burned in a combustion reaction, producing humid inert gas. This gas is transported down line 332 towards condenser 334 and PEM dryer 320.

Catalytic oxidation units such as OBIGGS 328 generate water as part of the combustion reaction occurring within OBIGGS 328. Catalytic oxidation units such as OBIGGS 328 benefit from humidity in system 300. Water vapor in system 300 keeps the catalyst of OBIGGS 328 cool. This mitigates the risk of sintering on account of the heat capacity of the water vapor.

Catalytic oxidation unit OBIGGS 328 can be cooled with cooling air to regulate temperature. Additionally, catalytic oxidation units may require further measures for use in aircraft. For example, a method of removing sulfur from fuel may be necessary to avoid poisoning the catalyst and removal of carbon dioxide from fuel may be necessary prior to introduction of fuel into catalytic oxidation unit OBIGGS 328. The fuel must be atomized or vaporized prior to introduction into catalytic oxidation unit OBIGGS 328. The source of process air into system 300 may also be scrubbed of fuel vapors and sulfurous compounds.

System 300 also includes controller 348, which is in communication with heat exchanger 314, PEM dryer 320, OBIGGS 328, and condenser 334. Controller 348 may be located elsewhere in the aircraft, but can communicate with and control function of components 314, 320, 328, and 334, according to flight conditions.

The discussed fuel tank inerting (FTI) system uses both electrochemical fuel tank inerting devices, such as electrochemical devices, and a PEM dryer to simultaneously manage oxygen and humidity content in gas used for fuel tank inerting. This system is compatible with low pressure engine bleed air during descent during which the low rotational speed of a throttled-back engine results in low pressure air. The PEM dryer is smaller than membrane gas dryers when the system is running at a lower pressure. This system additionally allows for recycling of water within the system to keep PEM based OBIGGS hydrated throughout operation.

DISCUSSION OF POSSIBLE EMBODIMENTS

The following are non-exclusive descriptions of possible embodiments of the present invention.

A fuel tank inerting system includes an inlet for taking in process air, an on-board inert gas generating system for converting the process air to inert gas, a proton exchange membrane dryer, and an outlet for receiving the dried inert gas from the anode and expelling the dried inert gas. The proton exchange membrane dryer includes a cathode for receiving the process air from the inlet and directing the process air to the on-board inert gas generating system and an anode for receiving and drying the inert gas from the on-board inert gas generating system to produce dried inert gas, so that the dried inert gas contains no more than five grams of water per kilogram of inert gas.

The system of the preceding paragraph can optionally include, additionally and/or alternatively, any one or more of the following features, configurations and/or additional components:

The on-board inert gas generating system is selected from the group consisting of a proton exchange membrane device, a solid oxide device, and a catalytic oxidation unit.

The on-board inert gas generating system is an electrolyzing gas separator.

The on-board inert gas generating system is a fuel cell.

The system includes a condenser downstream of the on-board inert gas generating system and upstream of the proton exchange membrane dryer anode, the condenser configured to condense water from the inert gas.

The system includes a compressed air source upstream of the inlet.

The system includes a pressure regulator downstream of the proton exchange membrane dryer anode.

The condenser is a condensing heat exchanger.

The condenser is located in the ram air duct and configured to use ram air as a cooling air flow.

The system includes a heat exchanger upstream of the proton exchange membrane dryer cathode.

The system includes a heat recovery heat exchanger including a first side for receiving and temperature controlling the inert gas from the on-board inert gas generating system, and a second side for receiving and temperature controlling the process air.

A method of fuel tank inerting includes flowing process air to an on-board inert gas generating system, producing inert gas with the on-board inert gas generating system, drying the inert gas with a proton exchange membrane dryer to produce dried inert gas having no more than five grams of water per kilogram of inert gas, and inerting a fuel tank with the dried inert gas.

The method of the preceding paragraph can optionally include, additionally and/or alternatively, any one or more of the following features, configurations and/or additional components:

The dried inert gas has no more than two grams of water per kilogram of inert gas.

The method includes condensing water from the inert gas to produce condensed inert gas prior to drying with the proton exchange membrane dryer.

The method includes decreasing pressure of the condensed inert gas prior to inerting the fuel tank.

The proton exchange membrane dryer includes an anode for receiving the humid inert gas, and a cathode for flowing process air from the inlet to the on-board inert gas generating system.

Drying the humid inert gas is done by flowing the humid inert gas through the anode.

The method includes recycling water from the humid inert gas by transporting the water from the anode to the cathode.

Producing humid inert gas comprises flowing process air into a proton exchange membrane device, a solid oxide device, or a catalytic oxidation unit.

The method includes pressure regulating the dried inert gas prior to inerting the fuel tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel tank inerting system comprising:
an inlet for taking in process air;
an on-board inert gas generating system for converting the process air to inert gas;
a proton exchange membrane dryer comprising:
 a cathode for receiving the process air from the inlet and directing the process air to the on-board inert gas generating system; and
 an anode for receiving and drying the inert gas from the on-board inert gas generating system to produce dried inert gas, so that the dried inert gas contains no more than five grams of water per kilogram of inert gas;
a condenser disposed downstream of the on-board inert gas generating system and upstream of the proton exchange membrane dryer, wherein the condenser is configured to condense water from the inert gas, and wherein the condenser is located in a ram air duct and is configured to use ram air as a cooling air flow when ram air is available and an alternative cold sink as the cooling air flow when ram air is not available, wherein the condenser is further configured to ensure its operating temperature does not drop below freezing when the cooling air flow is at subfreezing conditions; and an outlet for receiving the dried inert gas from the anode and expelling the dried inert gas.

2. The system of claim 1, wherein the on-board inert gas generating system is selected from the group consisting of a proton exchange membrane device, a solid oxide device, and a catalytic oxidation unit.

3. The system of claim 2, wherein the on-board inert gas generating system is an electrolyzing gas separator.

4. The system of claim 2, wherein the on-board inert gas generating system is a fuel cell.

5. The system of claim 1, further comprising a compressed air source upstream of the inlet.

6. The system of claim 5, further comprising a pressure regulator downstream of the proton exchange membrane dryer anode.

7. The system of claim 1, wherein the condenser is a condensing heat exchanger.

8. The system of claim 1, further comprising a heat exchanger upstream of the proton exchange membrane dryer cathode.

9. The system of claim 1, further comprising a heat recovery heat exchanger comprising:
a first side for receiving and temperature controlling the inert gas from the on-board inert gas generating system; and
a second side for receiving and temperature controlling the process air.

10. The system of claim 1, wherein the condenser is located at an entrance of the ram air duct.

11. The system of claim 1, wherein the on-board inert gas generating system is configured to produce inert gas with up to eight percent oxygen.

12. A method of fuel tank inerting comprising:
flowing process air to an on-board inert gas generating system;
producing inert gas with the on-board inert gas generating system;
condensing water from the inert gas in a condenser located at the entrance of a ram air duct to produce an inert gas having a first water content, wherein the ram air is a cooling air flow of the condenser when ram air is available and an alternative cold sink as the cooling air flow when ram air is not available, wherein the condenser is further configured to ensure its operating temperature does not drop below freezing when the cooling air flow is at subfreezing conditions;
flowing process air from an inlet of the on-board inert gas generating system through a cathode of the proton exchange membrane dryer;
drying the inert gas having the first water content with an anode of a proton exchange membrane dryer to produce dried inert gas having no more than five grams of water per kilogram of inert gas and having a second water content that is less than the first water content; and
inerting a fuel tank with the dried inert gas.

13. The method of claim 12, wherein the dried inert gas has no more than two grams of water per kilogram of inert gas.

14. The method of claim 12, further comprising decreasing pressure of the condensed inert gas prior to inerting the fuel tank.

15. The method of claim 12, wherein drying the humid inert gas is done by flowing the humid inert gas through the anode.

16. The method of claim 12, further comprising recycling water from the humid inert gas by transporting the water from the anode to the cathode.

17. The method of claim 12, wherein producing humid inert gas comprises flowing process air into a proton exchange membrane device, a solid oxide device, or a catalytic oxidation unit.

18. The method of claim 12, further comprising pressure regulating the dried inert gas prior to inerting the fuel tank.

* * * * *